(12) United States Patent
Zou (10) Patent No.: US 11,780,383 B2
(45) Date of Patent: Oct. 10, 2023

(54) FASTENER

(71) Applicant: ILLINOIS TOOL WORKS INC., Glenview, IL (US)

(72) Inventor: Yu Zou, Shanghai (CN)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 17/716,858

(22) Filed: Apr. 8, 2022

(65) Prior Publication Data

US 2022/0332261 A1 Oct. 20, 2022

(30) Foreign Application Priority Data

Apr. 20, 2021 (CN) .......................... 202110426237.6
Mar. 16, 2022 (CN) .......................... 202210258502.9

(51) Int. Cl.
*B60R 13/02* (2006.01)
*F16B 5/06* (2006.01)

(52) U.S. Cl.
CPC ........ *B60R 13/0206* (2013.01); *F16B 5/0635* (2013.01)

(58) Field of Classification Search
CPC .. B60R 13/0206; F16B 5/0635; F16B 5/0657; F16B 5/121; F16B 21/086
See application file for complete search history.

(56) References Cited

U.S. PATENT DOCUMENTS

| | | | | |
|---|---|---|---|---|
| 6,394,695 B1* | 5/2002 | Chausset | ................. | F16B 5/065 403/397 |
| 6,431,585 B1* | 8/2002 | Rickabus | .............. | B60R 21/216 280/730.2 |
| 7,290,795 B2* | 11/2007 | Kawai | ................... | B60R 21/215 24/297 |
| 8,046,880 B2* | 11/2011 | Katoh | ................... | F16B 5/0628 24/297 |
| 9,821,747 B2* | 11/2017 | Benedetti | .............. | F16B 21/075 |
| 10,155,487 B2* | 12/2018 | Zander | ................ | B60R 13/0206 |
| 2004/0016088 A1* | 1/2004 | Angellotti | ............... | F16B 5/065 24/297 |
| 2006/0032030 A1* | 2/2006 | Nessel | ................ | B60R 13/0206 24/297 |
| 2006/0239772 A1* | 10/2006 | Kuroda | ................. | F16B 5/0657 403/329 |
| 2008/0235919 A1* | 10/2008 | Giddings | .............. | F16B 21/065 24/289 |

(Continued)

*Primary Examiner* — Robert Sandy
*Assistant Examiner* — Rowland Do
(74) *Attorney, Agent, or Firm* — Quarles & Brady LLP (57) ABSTRACT

A fastener includes a mounting base and an insert portion. The mounting base includes an accommodating cavity having an accommodating cavity opening and a mounting slot located above the accommodating cavity having a width that is smaller than a width of the accommodating cavity. The insert portion includes a retaining portion, a neck portion connected to the retaining portion, and a head portion disposed between the retaining portion and the head portion. The head portion is configured to be received within the accommodating cavity by the accommodating cavity opening. The neck portion is configured such that at least a portion of the neck portion is received by the mounting slot when the head portion is received by the accommodating cavity.

9 Claims, 10 Drawing Sheets

(56) References Cited

U.S. PATENT DOCUMENTS

| | | | |
|---|---|---|---|
| 2009/0249587 A1* | 10/2009 | Donahue-Yan | F16B 5/0657 24/297 |
| 2012/0014766 A1* | 1/2012 | Kirchen | B60R 13/0206 411/508 |
| 2013/0168515 A1* | 7/2013 | Yamamoto | B60R 13/025 248/231.81 |
| 2014/0191526 A1* | 7/2014 | Lauxen | F16B 5/0628 296/1.08 |
| 2017/0253195 A1* | 9/2017 | Yamamoto | B60R 13/0206 |
| 2022/0325734 A1* | 10/2022 | Barrera | B60R 13/0206 |

* cited by examiner

FASTENER

CROSS REFERENCES TO RELATED APPLICATIONS

This application claims the benefit of Chinese Patent Application No. 202110426237.6, filed Apr. 20, 2021, and Chinese Patent Application No. 202210258502.9, filed Mar. 16, 2022, which are hereby incorporated by reference in their entirety.

TECHNICAL FIELD

The present disclosure relates to a fastener, and in particular to a fastener which is used for connecting two panels and can be removed.

BACKGROUND

Fasteners can be used for connecting multiple components together, for example, connecting interior trim parts, frames, panels and so on of a vehicle. For connection, a first component is firstly connected to a fastener, and then the fastener with the first component connected thereto is mounted on a corresponding position on a second component such that the first component and the second component are connected to each other. For example, in one application, an interior trim panel at a vehicle roof needs to be connected to a vehicle body metal plate by means of the fastener such that the interior trim panel is securely connected to the vehicle body metal plate.

SUMMARY

The present disclosure provides a fastener, comprising: a mounting base and an insert portion, wherein the mounting base comprises: an accommodating cavity and a mounting slot, with one side of the accommodating cavity being provided with an accommodating cavity opening; and the mounting slot being located above the accommodating cavity, with the width of the mounting slot being smaller than that of the accommodating cavity; and wherein the insert portion comprises: a retaining portion, a head portion and a neck portion, the head portion being configured to be capable of entering the accommodating cavity from the accommodating cavity opening; and the neck portion being connected to the retaining portion and the head portion and located between the retaining portion and the head portion, and the neck portion being configured such that at least a portion of the neck portion enters the mounting slot when the head portion enters the accommodating cavity.

According to the fastener described above, the neck portion comprises an upper section and a lower section, with the size of the upper section being larger than that of the lower section, and the lower section being capable of entering the mounting slot.

According to the fastener described above, the mounting base comprises a mounting base body, the mounting base body has a first side and a second side disposed opposite each other and an upper surface, the accommodating cavity opening is formed in the second side of the mounting base body, the mounting slot is in communication with the accommodating cavity and extends through the upper surface of the mounting base body and the second side of the mounting base body, and the width of the mounting slot is smaller than the size of the upper section of the neck portion and smaller than the size of the head portion. The insert portion can move relative to the mounting base so as to be connected to or separated from the mounting base, and the fastener has a locked state and an unlocked state; when the insert portion is connected to the mounting base, the lower section of the neck portion is located in the mounting slot, the head portion is located in the accommodating cavity, and the fastener is in the locked state; and when the insert portion is separated from the mounting base, the fastener is in the unlocked state.

The fastener described above further comprises: a connecting portion, wherein one end of the connecting portion is connected to the insert portion, and the other end thereof is connected to the mounting base; and the connecting portion has a certain flexibility.

According to the fastener described above, the mounting base further comprises an operating portion, the operating portion is connected to the first side of the mounting base body, and the operating portion is ring-shaped or hook-like.

According to the fastener described above, the mounting base body further comprises a lower window and an elastic portion, the lower window extends downward from the accommodating cavity until it penetrates the lower surface of the mounting base body, the elastic portion has a movable end, and the movable end is located in the lower window and is movable in the lower window.

According to the fastener described above, the head portion has a recess portion, the recess portion is formed by recessing inward from the outer side of the head portion, and when the fastener is in the locked state, the movable end of the elastic portion enters the recess portion.

According to the fastener described above, the insert portion comprises a base plate disposed between the neck portion and the retaining portion; the retaining portion comprises a support portion and a pair of retaining wings; the support portion is connected to one side of the base plate and extends in a direction away from the base plate; each retaining wing in the pair of retaining wings comprises a retaining wing body and a retaining wing extension portion; proximal ends of the retaining wing bodies are connected to a distal end of the support portion, and the retaining wing bodies obliquely extend in a direction toward the base plate and away from each other; and the retaining wing extension portion is connected to a distal end of the retaining wing body and extends beyond the retaining wing body in a direction away from the base plate.

According to the fastener described above, the retaining portion further comprises a pair of elastic pieces respectively located at two sides of the support portion, each elastic piece in the pair of elastic pieces obliquely extends from the upper surface of the base plate and respectively extends in a direction away from the support portion and the base plate.

The fastener described above is integrally formed from a thermoplastic material.

The fastener of the present disclosure can securely connect a first component to a second component and can be conveniently removed in a narrow mounting space.

DETAILED DESCRIPTION

Various specific embodiments of the present disclosure will be described below with reference to the accompanying drawings which constitute part of this description. It should be understood that although the terms such as "front", "rear", "upper", "lower", "left" and "right" indicating directions in the present disclosure are used to describe various exemplary structural parts and elements in the present disclosure, these terms used herein are merely used for ease of description and are determined based on the exemplary orientation shown in the accompanying drawings. Since the embodiments disclosed in the present disclosure can be arranged in different directions, these terms indicating directions are merely illustrative and should not be considered as limitations.

Figure 1A:
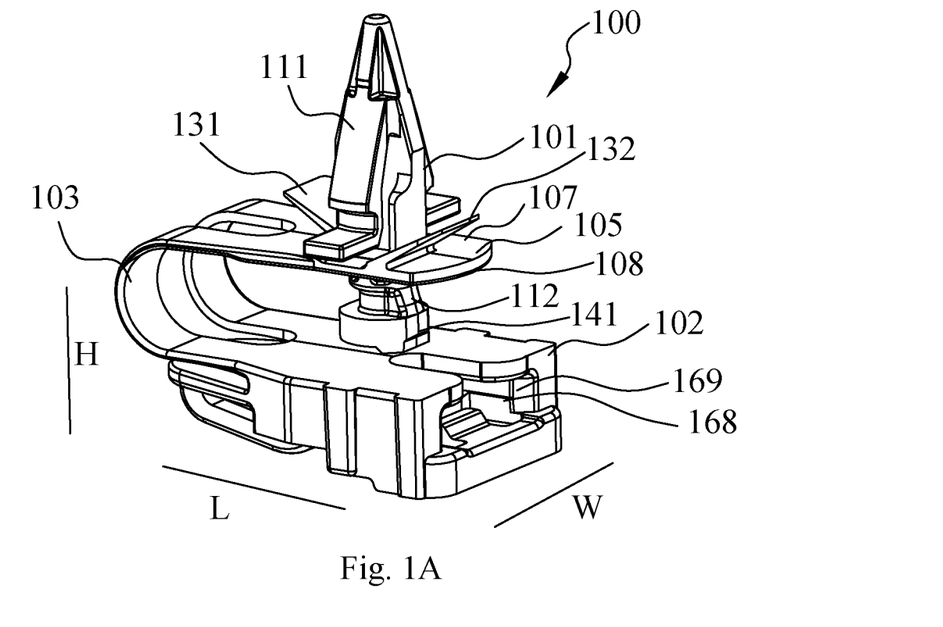
FIG. 1A is a perspective view of an exemplary embodiment of a fastener of the present disclosure in an unlocked state.
Figure 1B:
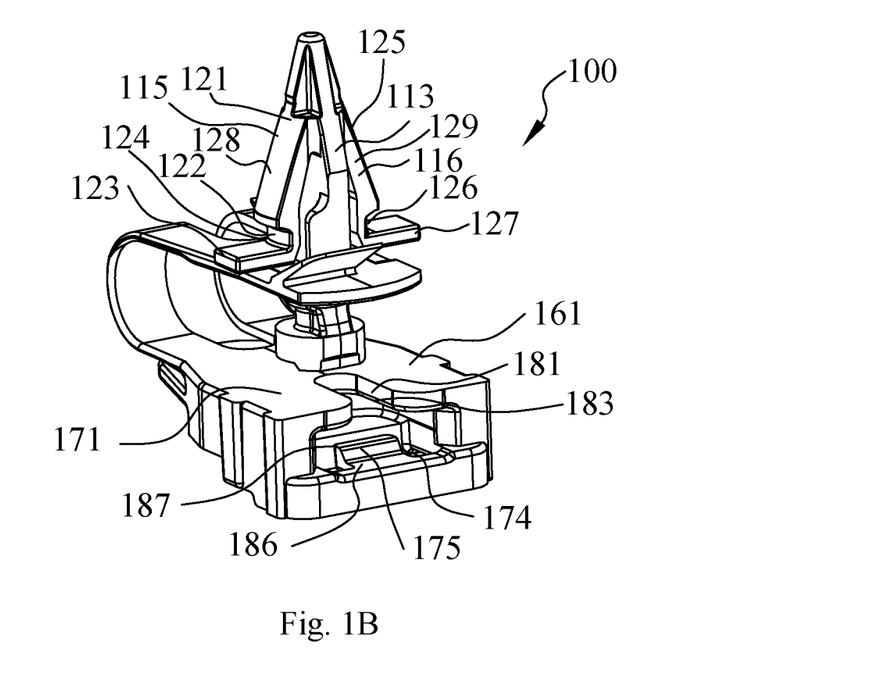
FIG. 1B is a perspective view of the fastener in FIG. 1A from another perspective.
Figure 1C:
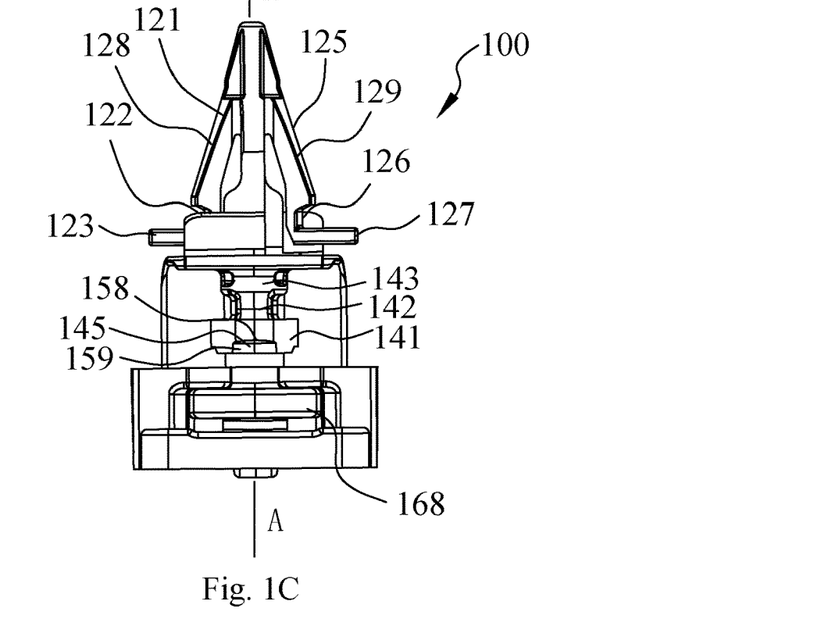
FIG. 1C is a front view of the fastener in FIG. 1A.
Figure 1D:
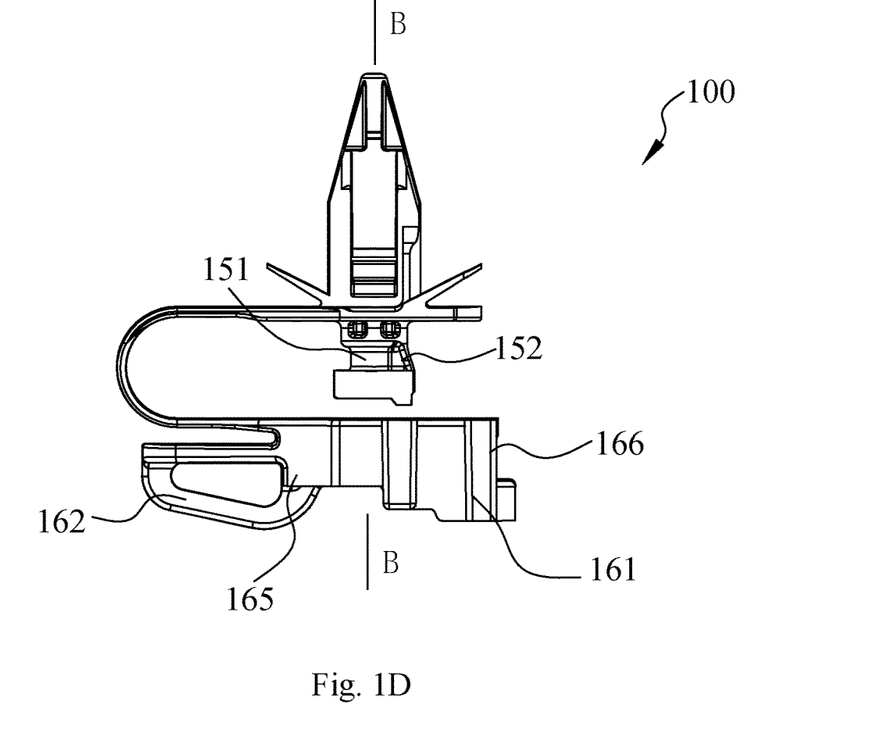
FIG. 1D is a side view of the fastener in FIG. 1A.

FIG. 1A is a perspective view of a first embodiment of a fastener 100 of the present disclosure in an unlocked state, FIG. 1B is a perspective view of the fastener 100 in FIG. 1A from another perspective, FIG. 1C is a front view of the fastener 100 in FIG. 1A, and FIG. 1D is a side view of the fastener 100 in FIG. 1A. FIGS. 1A, 1B, 1C and 1D show the fastener 100 in the unlocked state.

As shown in FIGS. 1A, 1B, 1C and 1D, the fastener 100 comprises an insert portion 101 and a mounting base 102. The insert portion 101 can move relative to the mounting base 102 so as to be connected to or separated from the mounting base 102. The insert portion 101 can cooperate with the mounting base 102 so as to connect a first component and a second component. In an embodiment of the present disclosure, the fastener 100 further comprises a connecting portion 103, the insert portion 101, the mounting base 102 and the connecting portion 103 are integrally formed from a thermoplastic material (for example, nylon), wherein the insert portion 101 and the mounting base 102 have a certain strength; and the connecting portion 103 is thin, has a certain flexibility and can move within a certain range. In an embodiment of the present disclosure, the connecting portion 103 may be made separately and then connected to the insert portion 101 and the mounting base 102. In another embodiment of the present disclosure, the fastener 100 only comprises the insert portion 101 and the mounting base 102, but does not comprise the connecting portion 103.

As also shown in FIGS. 1A, 1B, 1C and 1D, the fastener 100 has a length direction L, a width direction W, and a height direction H as shown. The insert portion 101 comprises a base plate 105, a retaining portion 111, a neck portion 112 and a head portion 141. The base plate 105 is substantially plate-shaped and has an upper surface 107 facing away from the mounting base 102 and a lower surface 108 facing toward the mounting base 102, the retaining portion 111 is connected to the upper surface 107 of the base plate 105, one end of the neck portion 112 is connected to the lower surface 108 of the base plate 105, and the other end of the neck portion 112 is connected to the head portion 141. The retaining portion 111 comprises a support portion 113 and a pair of retaining wings 115, 116. The support portion 113 extends upward from the upper surface 107 of the base plate 105 in the height direction, and the retaining wings 115 and 116 are respectively located at two sides of the support portion 113 in the width direction of the fastener 100. One end of each of the retaining wings 115 and 116 is respectively connected to a distal end of the support portion 113 and extends outward and obliquely toward the base plate 105, so that the extending direction of the retaining wings 115 and 116 forms a certain included angle with the support portion 113. The inner sides of the distal ends of the retaining wings 115 and 116 have a certain distance from the support portion 113 so that the retaining wings 115 and 116 can move within a certain range relative to the support portion 113.

As shown in FIG. 1B, the retaining wing 115 has a retaining wing body 128 and a retaining wing extension portion 123. The retaining wing body 128 comprises a front section 121 and a rear section 122. A portion of the front section 121 of the retaining wing body 128 is connected to the distal end of the support portion 113, and the other end thereof extends toward the base plate 105. An outer surface of the front section 121 of the retaining wing body 128 has a substantially inclined slope and forms an included angle with the extending direction of the support portion 113. The rear section 122 of the retaining wing body 128 is recessed toward the support portion 113 so as to form a recess portion 124, and the rear section 122 of the retaining wing body 128 extends substantially in an extending direction parallel to the support portion 113. One end of the retaining wing extension portion 123 is connected to the rear section 122, and extends beyond the front section 121 and the rear section 122 of the retaining wing body 128 in a direction substantially perpendicular to the support portion 113. The retaining wing extension portion 123 has a distance from the base plate 105. Similarly, the retaining wing 116 has a retaining wing body 129 and a retaining wing extension portion 127. The retaining wing body 129 comprises a front section 125 and a rear section 126.

The retaining portion 111 further comprises a pair of elastic pieces 131 and 132, and the elastic pieces 131 and 132 are respectively located on two sides of the support portion 113 in the length direction of the fastener 100. A pair of elastic pieces 131 and 132 separately extend upward from the upper surface of the base plate 105 and extend in a direction away from the support portion 113. The connection between the pair of elastic pieces 131 and 132 and the base plate 105 is close to the support portion 113. In the width direction of the fastener 100, the width of the elastic pieces 131 and 132 are smaller than that of the base plate 105, one side of the elastic piece 131 is flush with a first side edge of the base plate 105, and the other side has a distance from a second side edge of the base plate 105. One side of the elastic piece 132 is flush with the second side edge of the base plate 105, and the other side has a distance from the first side edge of the base plate 105. In the height direction of the fastener 100, the respective distal ends of the pair of elastic pieces 131 and 132 exceed the height of the retaining wing extension portion 123 of the retaining wing 115 and the retaining wing extension portion 127 of the retaining wing 116, and are substantially flush with the upper portions of the rear section 122 of the retaining wing 115 and the rear section 126 of the retaining wing 116. The pair of elastic pieces 131 and 132 has a certain elasticity, and can be bent toward the base plate 105 when subjecting to a downward external force. The retaining portion 111 is configured to be connected to the first component.

As shown in FIGS. 1A and 1B, the neck portion 112 extends downward from the lower surface 108 of the base plate 105. The neck portion 112 comprises an upper section 143 and a lower section 142. The upper section 143 is substantially cylindrical and is connected to the base plate 105. Two ends of the lower section 142 are respectively connected to the head portion 141 and the upper section 143. At least a portion of the head portion 141 is cylindrical, and in the length direction of the fastener 100, the side of the head portion 141 away from the connecting portion 103 has a recess portion 145, and the recess portion 145 is formed by recessing inward from the outer surface and the lower surface of the head portion 141. The top surface and side surface of the recess portion 145 are respectively shaped as an upper abutting surface 158 and a side abutting surface 159. The lower section 142 of the neck portion 112 comprises a substantially cylindrical body portion 151 and an additional portion 152 connected thereto. The outer diameter of the body portion 151 is smaller than that of the head portion 141 and smaller than that of the upper section 143. The additional portion 152 is located on the side of the lower section 142 away from the connecting portion 103 and extends to be flush with the head portion 141 and the upper section 143. In the width direction W of the fastener 100, the maximum width of the lower section 142 of the neck portion 112 is smaller than the outer diameter of the head portion 141 and smaller than the outer diameter of the upper section 143, so that the lower section 142 of the neck portion 112 is a thinner portion of the neck portion 112.

As shown in FIGS. 1A, 1B, 1C and 1D, the mounting base 102 comprises a mounting base body 161 and an operating portion 162, the mounting base body 161 has a first side 165 close to the connecting portion 103 and a second side 166 away from the connecting portion 103. The operating portion 162 is connected to the first side 165 of the mounting base body 161. The operating portion 162 is hollow ring-shaped, and an operator can insert a hook-like tool into a hollow space of the operating portion 162 to act on the operating portion 162 so as to move the mounting base 102. In other embodiments, the operating portion 162 may also be non-closed loop, such as hook-like, as long as it is convenient to cooperate with the hook-like tool. The mounting base 102 has an accommodating cavity 168 that is formed by recessing inward from the second side 166 of the mounting base body 161, and the accommodating cavity 168 has an accommodating cavity opening 169 located in the second side 166. That is to say, the accommodating cavity 168 extends through the second side 166 so as to form an accommodating cavity opening 169. The mounting base 102 further has a flat upper surface 171 and a mounting slot 181, and the mounting slot 181 is substantially U-shaped opening at one end. The opening 183 of the mounting slot 181 faces the second side 166. The mounting slot 181 is located above the accommodating cavity 168 and is in communication with the accommodating cavity 168. The opening 183 of the mounting slot 181 is in communication with the accommodating cavity opening 169. The insert portion 101 can enter the mounting base 102 from the opening 183 of the mounting slot 181 and the accommodating cavity opening 169.

In the width direction of the fastener 100, the width of the mounting slot 181 is slightly larger than the maximum width of the lower section 142 of the neck portion 112, such that the lower section 142 of the neck portion 112 can smoothly enter the mounting slot 181. Also, the width of the mounting slot 181 is smaller than the maximum width of the upper section 143 of the neck portion 112 such that the upper section 143 of the neck portion 112 cannot enter the mounting slot 181. As the lower section 142 of the neck portion 112 enters the mounting slot 181, the head portion 141 enters the accommodating cavity 168 at the same time. In this disclosure, the shape of the head portion 141 substantially conforms with the shape of the accommodating cavity 168 such that the head portion 141 is less liable to wobbling in the accommodating cavity 168.

The mounting base body 161 further comprises a lower window 174 and an elastic portion 175, the lower window 174 extends downward from the accommodating cavity 168 until it penetrates the lower surface of the mounting base body 161. The elastic portion 175 is located in the lower window 174. The elastic portion 175 has a connecting end 186 and a movable end 187, wherein the connecting end 186 is connected to the inner edge 178 of the lower window 174 close to the second side 166 of the mounting base body 161, and the movable end 187 is in a overhead state, so that the movable end 187 of the elastic portion 175 can move within the lower window 174. In the height direction of the fastener 100, the height of the distal end of the elastic portion 175 is larger than that of the connection between the elastic portion 175 and the inner edge 178 of the lower window 174.

The connecting portion 103 is flat strip-shaped. One end of the connecting portion 103 is connected to the base plate 105, and the other end thereof is connected to the first side 165 of the mounting base body 161 and forms smooth transition with the upper surface 171 of the mounting base 102.

Figure 2A:
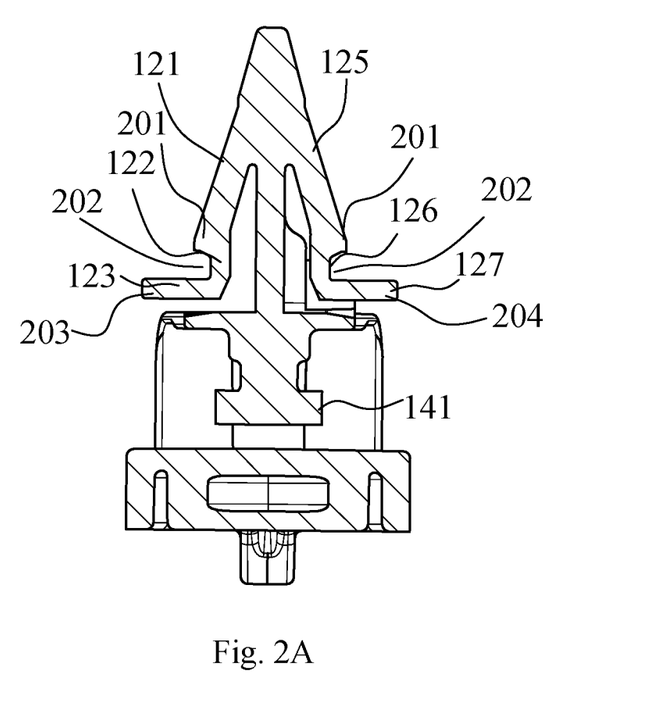
FIG. 2A is a cross-sectional view taken along line A-A in FIG. 1C.
Figure 2B:
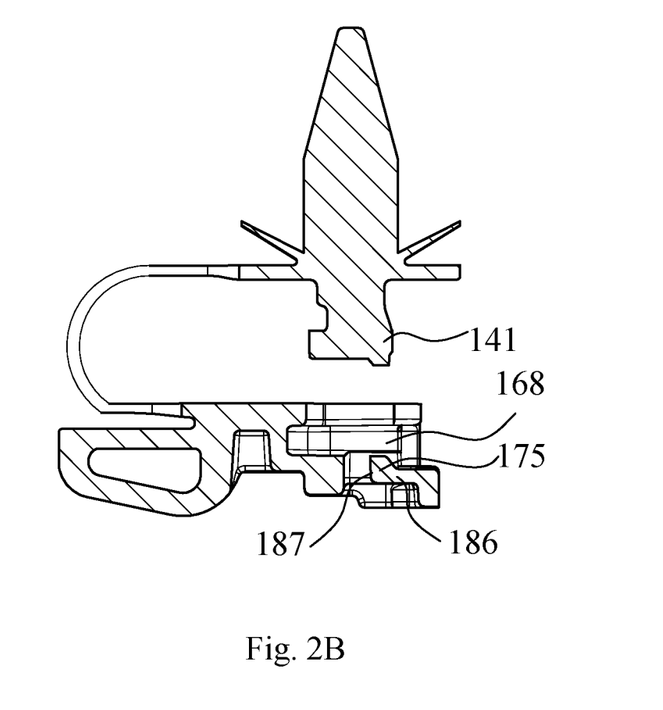
FIG. 2B is a cross-sectional view taken along line B-B in FIG. 1D.

FIG. 2A is a cross-sectional view taken along line A-A in FIG. 1C, FIG. 2B is a cross-sectional view taken along line B-B in FIG. 1D, and FIGS. 2A and 2B more clearly illustrate the structure of the insert portion 101 and the mounting base 102. Referring to FIGS. 1C and 2A, the front section 121 of the retaining wing 115 and the front section 125 of the retaining wing 116 of the retaining portion 111 form an inverted taper that tapers from top to bottom, and the respective bottoms of the front section 121 of the retaining wing 115 and the front section 121 of the retaining wing 116 forms a hip portion 201. The rear section 122 of the retaining wing 115 and the rear section 126 of the retaining wing 116 form a thinner waist portion 202. The retaining wing extension portion 123 of the retaining wing 115 and the retaining wing extension portion 127 of the retaining wing 116 respectively extend outward beyond two side edges of the base plate 105 to form a pair of claw portions 203 and 204. When the fastener is connected to the first component, the first component is flush with the waist portion 202 of the retaining portion 111 so as to be less liable to moving relative to the fastener. A pair of claw portions are used to remove the fastener 100 from the first component, which will be described in detail below.

Figure 3A:
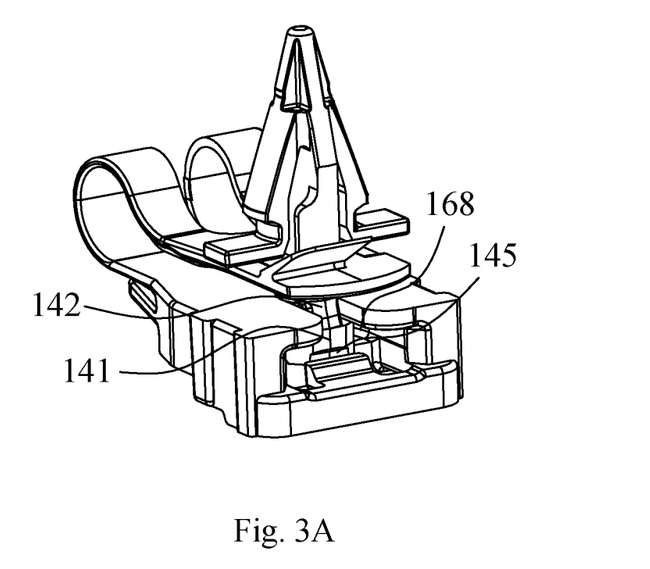
FIG. 3A is a perspective view of the fastener in FIG. 1A in a locked state.
Figure 3B:
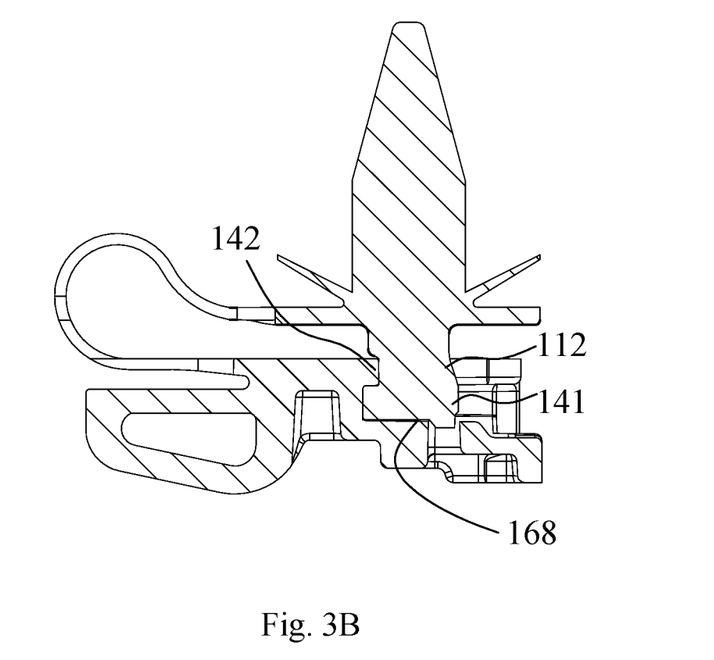
FIG. 3B is a cross-sectional view of the fastener in FIG. 3A.

FIG. 3A is a perspective view of the fastener of FIG. 1A in a locked state, FIG. 3B is a cross-sectional view of the fastener of FIG. 3A, and FIGS. 3A and 3B illustrate the locked state of the fastener.

As shown in FIGS. 3A and 3B, when the fastener 100 is in the locked state, the lower section 142 of the neck portion 112 is located in the mounting slot 181, and the head portion 141 is located in the accommodating cavity 168. The side of the head portion 141 away from the second side 166 abuts against an inner wall of the accommodating cavity 168 and/or the lower section 142 of the neck portion 112 abuts against the U-shaped bottom of the mounting slot 181 such that in the length direction of the fastener 100, the insert portion 101 cannot move relative to the mounting base 102 away from the second side 166 of a lower body of the mounting base. The outer diameter of the head portion 141 is larger than the width of the mounting slot 181, such that the head portion 141 cannot be escaped from the mounting slot 181 in the height direction of the fastener 100, that is to say, the insert portion 101 cannot move upward relative to the mounting base 102. Meanwhile, the size of the upper section 143 of the neck portion 112 is larger than the width of the mounting slot 181, so that the lower section 142 of the neck portion 112 cannot enter the mounting slot 181 downward, that is to say, the insert portion 101 cannot move downward in the height direction relative to the mounting base 102. The upper portion of the distal end of the elastic portion 175 is partially located in the recess portion 145 of the head portion 141, and the upper abutting surface 158 of the recess portion 145 can be in contact with the top of the elastic portion 175, thereby limiting the downward movement of the insert portion 101 relative to the mounting base 102 in the height direction of the fastener 100. The side abutting surface 159 of the recess portion 145 can be in contact with the side of the elastic portion 175, thereby limiting the movement of the insert portion 101 toward the second side 166 relative to the mounting base 102 in the length direction of the fastener 100. In view of the above, when the fastener 100 is in the locked state, the insert portion 101 cannot move relative to the mounting base 102, or can only slightly move within a small range.

Figure 4:
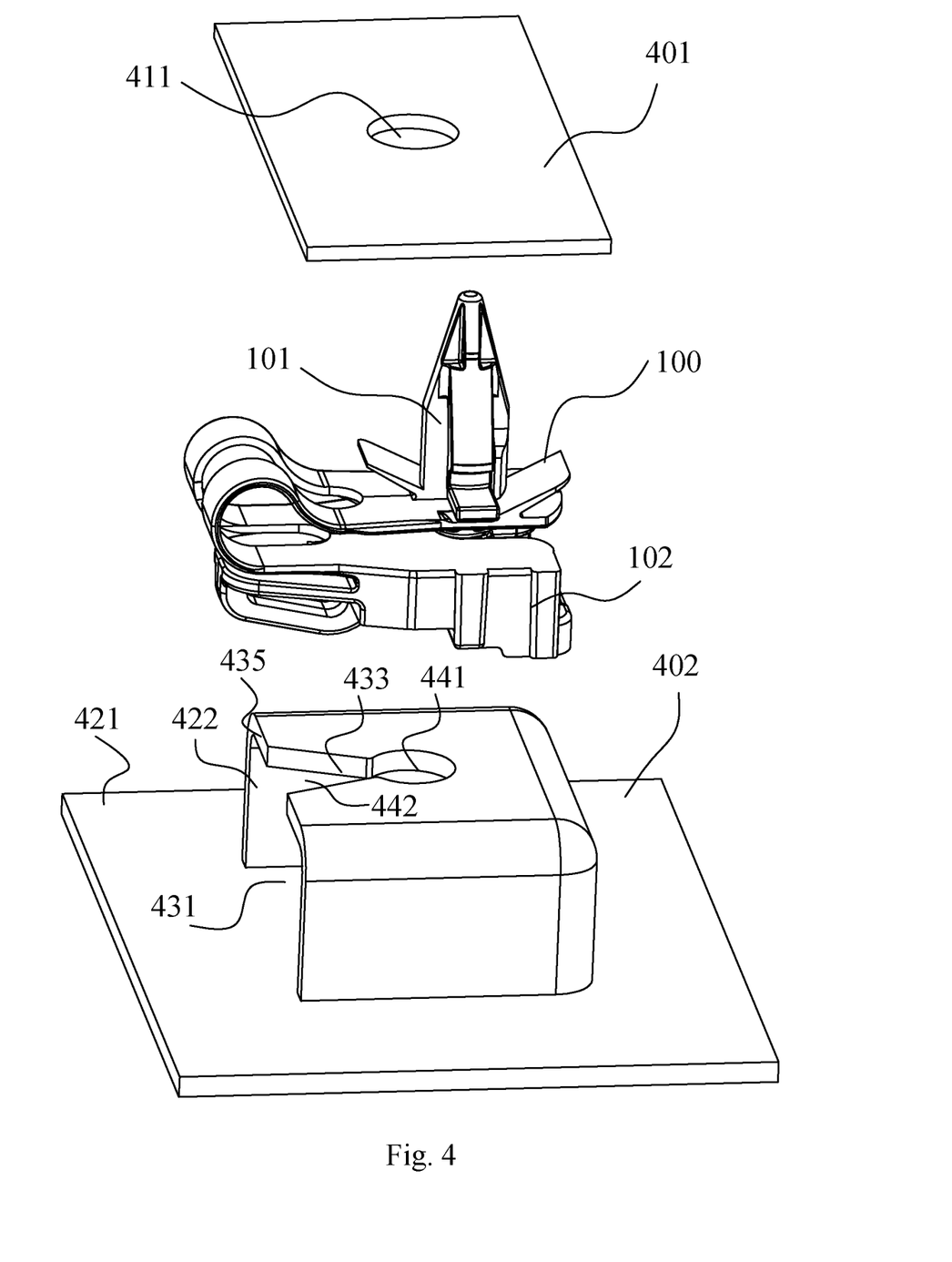
FIG. 4 is a perspective view of a first component, the fastener and a second component.

FIG. 4 is a perspective view of a first component, the fastener and a second component. As shown in FIG. 4, the fastener 100 is used for connecting the first component 401 to the second component 402. In an embodiment in the present disclosure, the first component 401 is a metal plate of a vehicle, and the second component 402 is an interior trim panel at a vehicle roof. When the first component 401 and the second component 402 are connected, the fastener 100 is first connected to the second component 402, and then the fastener 100 with the second component 402 connected thereto is connected to the first component 401, such that the first component 401 is connected to the second component 402.

The first component 401 has a hole 411 for cooperating with the insert portion 101 of the fastener. The second component 402 has a panel 421 and a box portion 422. The bottom of the box portion 422 is connected to the panel 421, one side of the box portion 422 has an opening 431, and the top of the box portion 422 has a slot 433. The side of the top of the box portion 422 close to the opening 431 has a top side edge 435, and the slot 433 is formed by extending inward from the top side edge 435 to the interior of the top of the box portion. The slot 433 penetrates the top of the box portion 422 in a vertical direction, and the slot 433 is in communication with the space inside the box portion 422. The slot 433 comprises a central portion 441 and a guiding portion 442, the central portion 441 is substantially circular, with the inner diameter thereof corresponding to the size of the upper section 143 of the neck portion 112, and the guiding portion 442 is of a substantially trapezoidal shape that gradually increases from the central portion toward the top side edge 435, thereby facilitating guiding the fastener 100 into the central portion 441. In this embodiment, the inner diameter of the central portion 441 is larger than or equal to the outer diameter of the head portion 141, that is to say, the neck portion 112 can be inserted into or pulled out from the central portion 441.

Figure 5A:
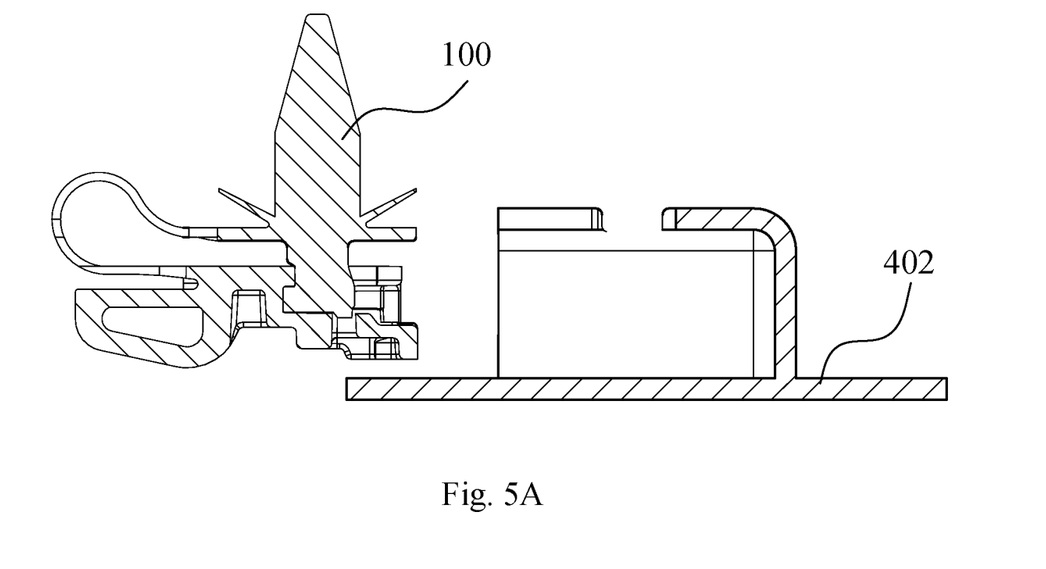
FIG. 5A is a cross-sectional view of the fastener separated from the second component.
Figure 5B:
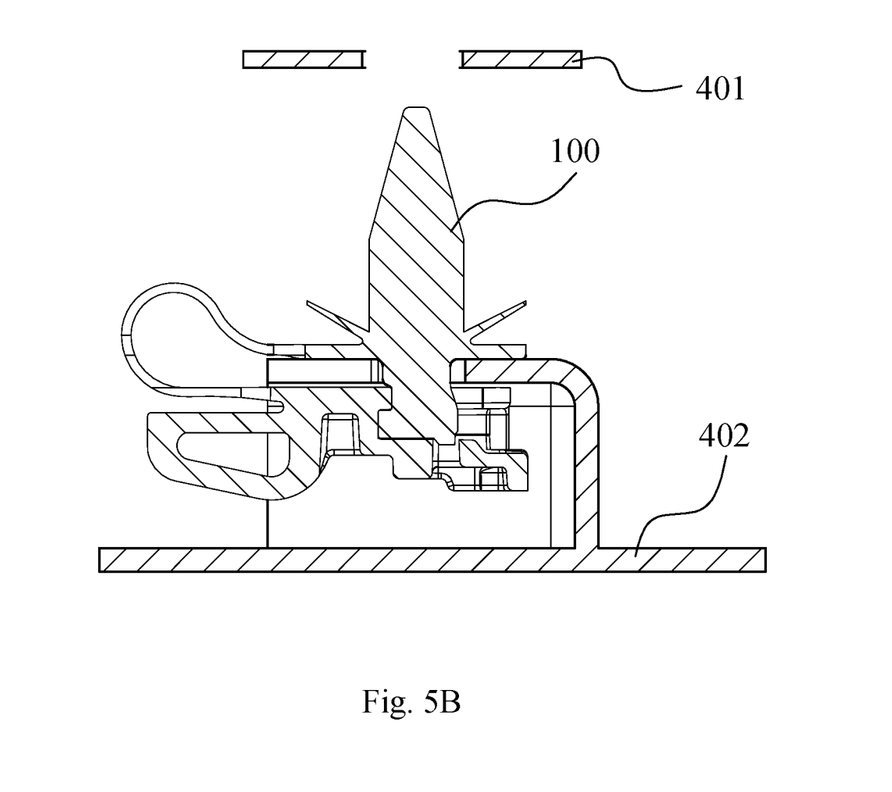
FIG. 5B is a cross-sectional view of the second component and the first component mounted.
Figure 5C:
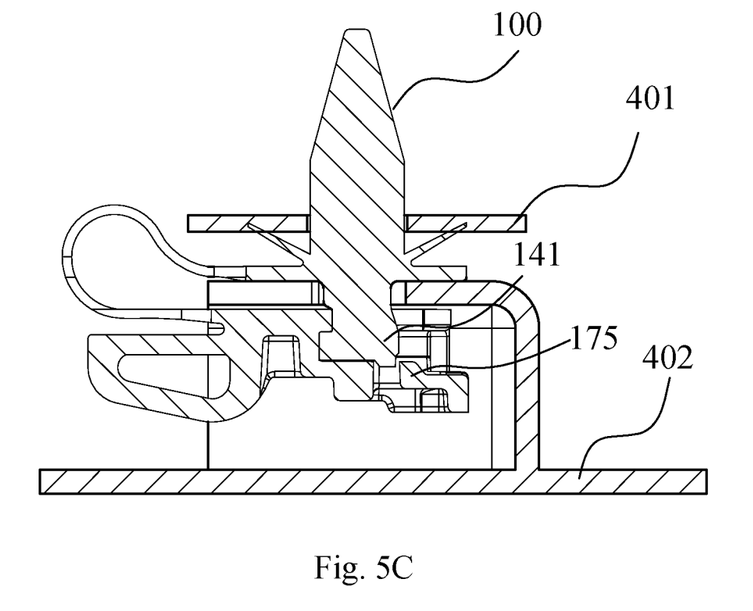
FIG. 5C is a cross-sectional view of the first component, the second component and the fastener mounted.

FIG. 5A is a cross-sectional view in which the fastener is separated from the second component, FIG. 5B is a cross-sectional view in which the second component and the first component are mounted, and FIG. 5C is a cross-sectional view in which the first component, the second component and the fastener are mounted in place. FIGS. 5A, 5B and 5C illustrate a mounting process for the fastener.

As shown in conjunction with FIGS. 1A and 5A, before the fastener 100 is mounted on the second component 402, first confirm that the fastener is in the locked state. Next, the upper section 143 of the neck portion 112 of the fastener 100 in the locked state is disposed substantially flush with the top slot 433 of the box portion of the second component 402, and the second side 166 of the mounting base body 161 faces the opening of the slot 433. The fastener 100 is pushed into the slot 433 until the upper section 143 is located in central portion 441 of the slot 433. The narrowest part of the guiding portion 442 is smaller than the outer diameter of the upper section 143 of the neck portion 112, such that when entering the central portion by means of the guiding portion 442, the upper section 143 subjects to a certain external force to deform the upper section 143 of the neck portion 112 and the top of the box portion 422, and the upper section 143 of the neck portion 112 is pressed into the central portion 441.

FIG. 5B is a schematic view in which the fastener is located in the second component 402, and in the state shown in FIG. 5B, the fastener 100 is connected to the second component 402 and is less liable to dropping from the second component 402.

FIG. 5C is a view showing a state in which the fastener is connected to the second component and the first component. The upper insert portion 101 of the fastener 100 is inserted into the hole 411 of the first component 401. An edge of the hole 411 of the first component 401 is first in contact with the upper sections 143 of the pair of retaining wings 115 and 116 and is pressed and bent inward to deform until the hip portions 201 of the pair of retaining wings pass through the hole 411, the waist portions 202 of the pair of retaining wings 115 and 116 are then flush with the first component 401, the deformation of the pair of retaining wings 115 and 116 is recovered, and the hip portion 201 abuts against the first side of the first component 401 to prevent the fastener 100 from escaping from the first component 401. The pair of elastic pieces 131 and 132 abut against the second side of the first component 401 such that the first component 401 is less liable to wobbling relative to the fastener 100. At this time, the fastener 100 connects the first component 401 to the second component 402.

Figure 6A:
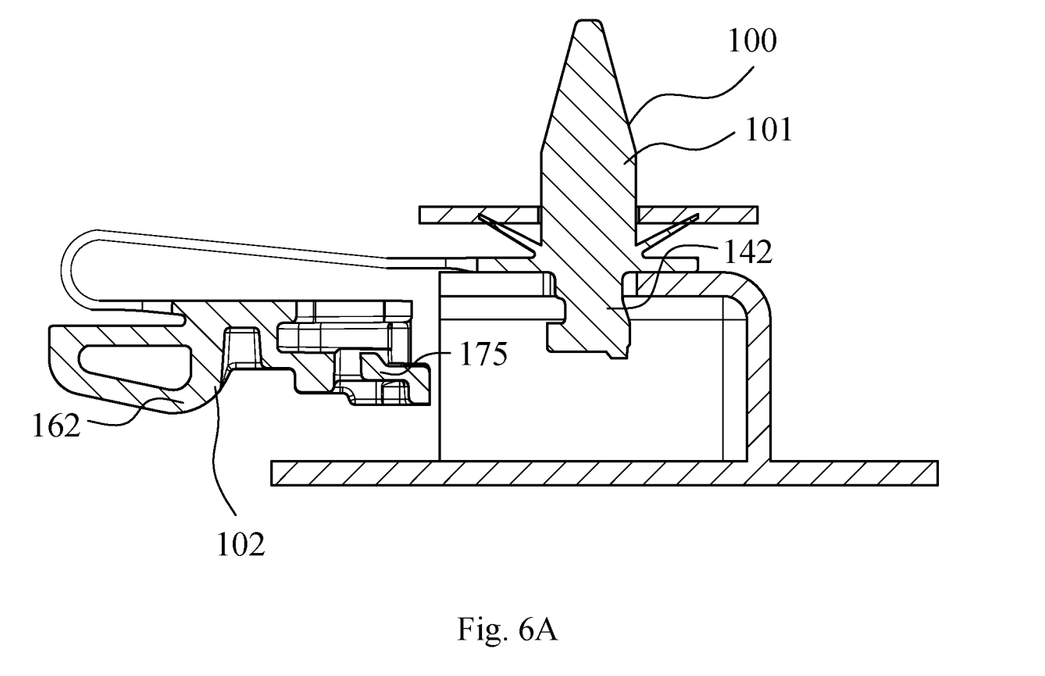
FIG. 6A is a cross-sectional view of the fastener, in the unlocked state, mounted on the first component and the second component.
Figure 6B:
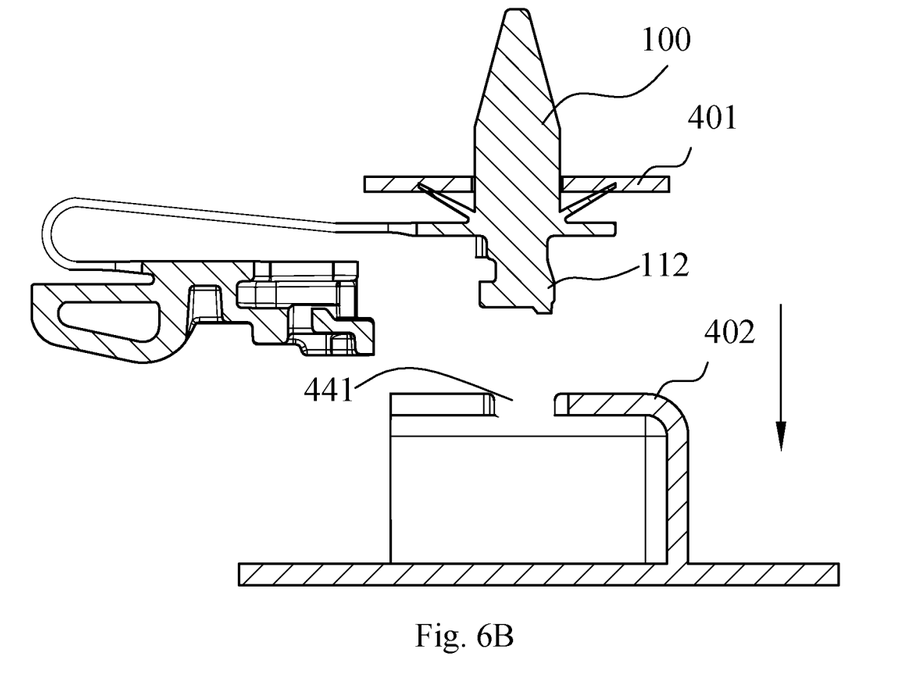
FIG. 6B is a perspective view of the fastener connected to the first component and separated from the second component.
Figure 6C:
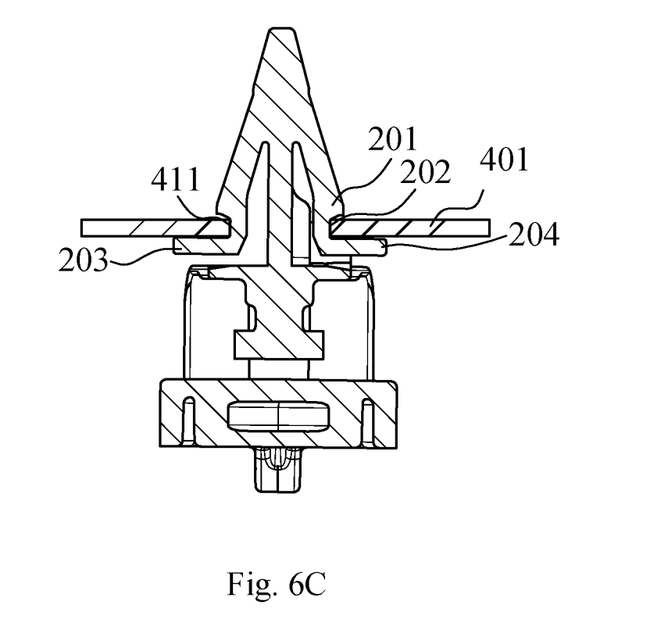
FIG. 6C is a perspective view of the fastener and the first component connected to each other.
Figure 6D:
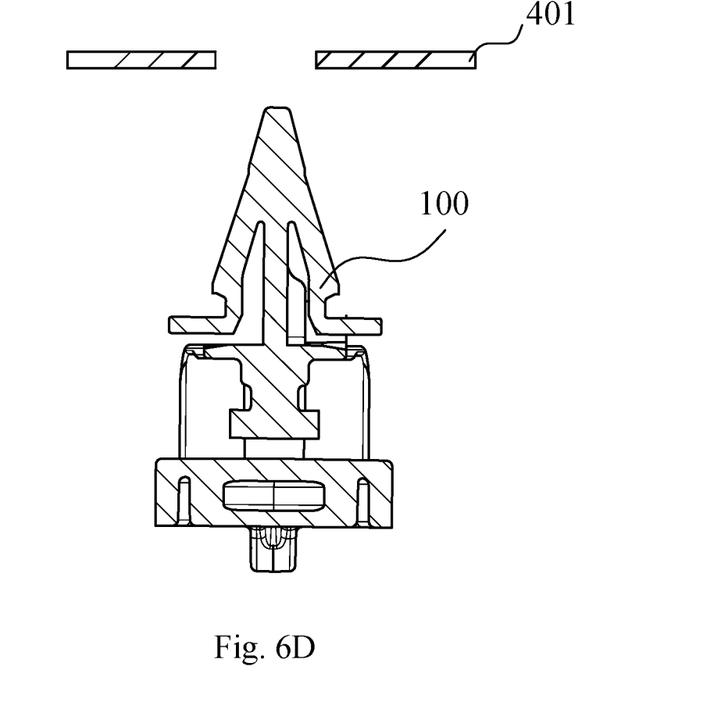
FIG. 6D is a cross-sectional view of the fastener separated from the first component.

FIG. 6A is a cross-sectional view of the fastener, in the unlocked state, mounted on the first component and the second component, FIG. 6B is a perspective view in which the fastener connected to the first component is separated from the second component, FIG. 6C is a perspective view in which the fastener and the first component are connected to each other, and FIG. 6D is a cross-sectional view in which the fastener is separated from the first component. FIGS. 6A, 6B, 6C and 6D illustrate the process of removing the fastener 100 from the first component 401 and the second component 402. FIGS. 6A and 6B are cross-sectional views taken along the length direction and the height direction of the fastener 100, and FIGS. 6C and 6D are cross-sectional views taken along the width direction and the height direction of the fastener 100.

When the second component 402 needs to be separated from the first component 401, the operator may insert a hook or similar tool into the opening 431 of the box portion 422 to insert into the operating portion 162 of the mounting base 102. At this time, the operator pulls the hook to move the mounting base 102 relative to the insert portion 101, such that the upper section 143 of the neck portion 112 of the insert portion 101 slides out of the mounting slot 181, in this way, the insert portion 101 is separated from the mounting base 102. As the operator pulls the mounting base 102 toward the left using the tool, the head portion 141 is in contact with the upper portion of the elastic portion 175 and applies a rightward pushing force to the upper portion of the elastic portion 175, and the upper portion of the elastic portion 175 is pressed by an external force to deform and bend downward, so that the head portion 141 can be separated from the accommodating cavity 168 across the upper portion of the elastic portion 175, and the fastener 100 is in the unlocked state.

As shown in FIG. 6B, when the fastener 100 is in the unlocked state, the second component 402 is moved downward, the neck portion 112 is escaped from the central portion 441 of the slot 433 of the second component 402, and the second component 402 is separated from the fastener 100. In this embodiment, the outer diameter of the head portion 141 is not larger than the inner diameter of the central portion 441, so that the second component 402 can move downward in the height direction of the fastener 100 and thus be separated from the fastener 100.

As shown in FIG. 6C, when the fastener 100 is connected to the first component 401, the inner side edge of the hole 411 in the first component 401 enters the waist portion 202 of the retaining portion 111, the upper surface of the first component 401 abuts against the hip portion 201 of the retaining portion 111, and the lower surface of the first component 401 abuts against the distal ends of the pair of elastic pieces 131 and 132. The first component 401 is clamped between the hip portions 201 and the pair of elastic pieces 131 and 132. When the fastener 100 needs to be removed from the first component 401, the operator applies pressure to the pair of claw portions 203 and 204, so that the pair of claw portions 203 and 204 move toward each other so as to make the pair of retaining wings 115 and 116 bend toward the support portion. At this time, the width of the hip portion 201 is decreased and thus can pass through the hole 411, and when the operator pulls the fastener 100 downward, the fastener 100 can be escaped from the hole 411, so that the fastener 100 is separated from the first component.

As shown in FIG. 6D, the fastener 100 can be moved downward in the height direction of the fastener 100 under an external force and removed from the first component 401.

The fastener 100 of the present disclosure can be removed repeatedly to facilitate maintenance of the vehicle. The fastener 103 of the present disclosure can be adapted to a narrow mounting environment, and even if an operating space is small, removal may also be achieved by means of a tool such as a hook. The insert portion 101 and the mounting base 102 of the fastener 100 in the present disclosure are connected by means of the connecting portion 103, and can be conveniently assembled. Therefore, it is possible to prevent affection to the assembly efficiency due to the loss of one of the insert portion 101 and the mounting base 102 during mounting or removal. The fastener 100 of the present disclosure remains locked after leaving factory to facilitate transportation and mounting, and the fastener 100 is adjusted to be in the unlocked state only when it needs to be removed.

Figure 7A:
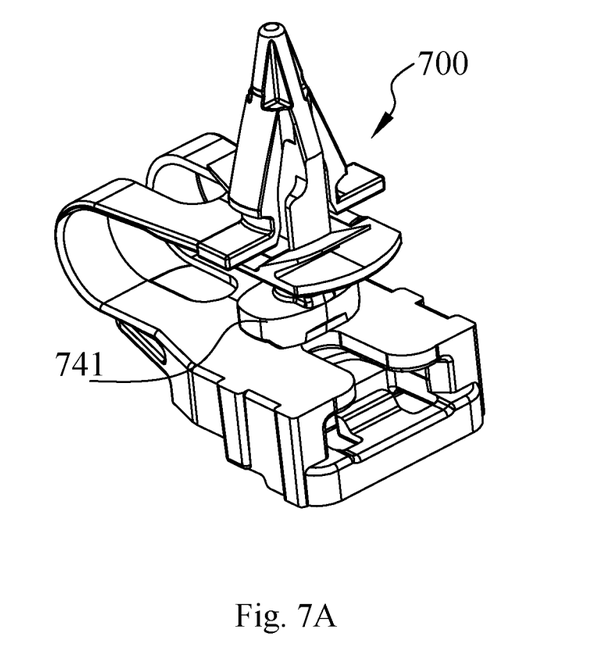
FIG. 7A is a perspective view of another embodiment of a fastener of the present disclosure.
Figure 7B:
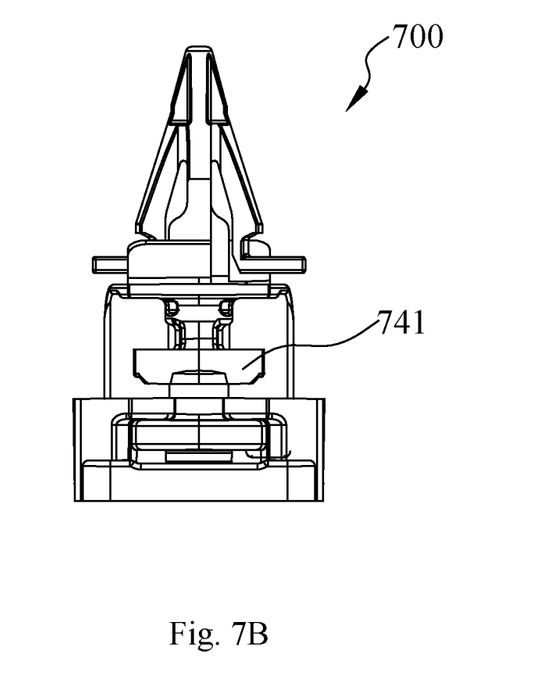
FIG. 7B is a side view of the fastener in FIG. 7A.

FIG. 7A is a perspective view of a second embodiment of the fastener of the present disclosure, and FIG. 7B is a side view of the fastener in FIG. 7A. Similar to the embodiment shown in FIG. 1A, except that the head portion 741 of the fastener 700 shown in FIGS. 7A and 7B has a different size. As shown in FIGS. 7A and 7B, the head portion 741 of the lower portion 712 of the insert portion is substantially elliptic cylindrical, and the maximum width of the head portion 741 in the width direction of the fastener 700 is larger than the inner diameter of the central portion 441 of the slot 433 of the second component 402, so that when the fastener 700 is removed from the second component 402, the second component 402 cannot be directly moved downward and separated from the fastener 700 in the unlocked state; instead, the slot 433 in the top of the box portion of the second component 402 is aligned with the lower section 142 of the neck portion 112, and the second component 402 is pulled, so that the second component 402 is separated from the fastener 700. The embodiment shown in FIG. 7A is applicable to the embodiments in which the second component 402 can move in a horizontal direction.

Although only some features of the present disclosure are illustrated and described herein, those skilled in the art may make various improvements and changes. Therefore, it should be understood that the appended claims are intended to encompass all the above improvements and changes that fall within the substantial spirit and scope of the present disclosure.

The invention claimed is:

1. A fastener, comprising:
    a mounting base and an insert portion, the insert portion is capable of moving relative to the mounting base so as to be connected to or separated from the mounting base, wherein the mounting base comprises:
        an accommodating cavity, with one side thereof being provided with an accommodating cavity opening;
        a mounting base body, the mounting base body has a first side and a second side disposed opposite each other and an upper surface, the accommodating cavity opening is formed in the second side of the mounting base body; and
        a mounting slot, the mounting slot being located above the accommodating cavity, and the width of the mounting slot being smaller than that of the accommodating cavity; and wherein the insert portion comprises:
        a retaining portion;
        a head portion, the head portion being configured to be capable of entering the accommodating cavity from the accommodating cavity opening; and
        a neck portion, the neck portion being connected to the retaining portion and the head portion and located between the retaining portion and the head portion, and the neck portion being configured such that at least a portion of the neck portion enters the mounting slot when the head portion enters the accommodating cavity, wherein the mounting slot is in communication with the accommodating cavity and extends through the upper surface of the mounting base body and the second side of the mounting base body, and the width of the mounting slot is smaller than the size of the upper section of the neck portion and smaller than the size of the head portion, and wherein the fastener has a locked state and an unlocked state, wherein the fastener is in the locked state when the insert portion is connected to the mounting base, the lower section of the neck portion is located in the mounting slot, and the head portion is located in the accommodating cavity, and wherein the fastener is in the unlocked state when the insert portion is separated from the mounting base.

2. The fastener of claim 1, wherein the neck portion comprises an upper section and a lower section, with the size of the upper section being larger than that of the lower section, and the lower section being capable of entering the mounting slot.

3. The fastener of claim 1, further comprising: a connecting portion, wherein one end of the connecting portion is connected to the insert portion, and the other end thereof is connected to the mounting base; and the connecting portion has a certain flexibility.

4. The fastener of claim 1, wherein the mounting base further comprises an operating portion, the operating portion is connected to the first side of the mounting base body, and the operating portion is ring-shaped or hook-like.

5. The fastener of claim 1, wherein the mounting base body further comprises a lower window and an elastic portion, the lower window extends downward from the accommodating cavity until it penetrates the lower surface of the mounting base body, the elastic portion has a movable end, and the movable end is located in the lower window and is movable in the lower window.

6. The fastener of claim 5, wherein the head portion has a recess portion, the recess portion is formed by recessing inward from the outer side of the head portion, and when the fastener is in the locked state, the movable end of the elastic portion enters the recess portion.

7. The fastener of claim 1, wherein the insert portion comprises a base plate disposed between the neck portion and the retaining portion; the retaining portion comprises a support portion and a pair of retaining wings; the support portion is connected to one side of the base plate and extends in a direction away from the base plate; each retaining wing in the pair of retaining wings comprises a retaining wing body and a retaining wing extension portion; proximal ends of the retaining wing body are connected to a distal end of the support portion, and the retaining wing bodies obliquely extend in a direction toward the base plate and away from each other; and the retaining wing extension portion is connected to a distal end of the retaining wing body and extends beyond the retaining wing body in a direction away from the base plate.

8. The fastener of claim 7, wherein the retaining portion further comprises a pair of elastic pieces respectively located at two sides of the support portion, each elastic piece in the pair of elastic pieces obliquely extends from the upper surface of the base plate and respectively extends in directions away from the support portion and the base plate.

9. The fastener of claim 1, wherein the fastener is integrally formed from a thermoplastic material.

* * * * *